ELECTRONIC DIGITAL COMPUTING MACHINES

Filed March 13, 1961

INVENTORS
Tom Kilburn
David Beverley George Edwards
BY
Cushman, Darby & Cushman
ATTORNEY INVENTOR
Tom Kilburn
David Beverly George Edwards
BY
Cushman, Darby & Cushman
ATTORNEY United States Patent Office 3,248,702
Patented Apr. 26, 1966

3,248,702
ELECTRONIC DIGITAL COMPUTING MACHINES

Tom Kilburn, Urmston, and David Beverley George Edwards, Manchester, England, assignors, by mesne assignments, to International Business Machines Corporation, New York, N.Y., a corporation of New York
Filed Mar. 13, 1961, Ser. No. 95,379
Claims priority, application Great Britain, Mar. 16, 1960, 9,300/60
21 Claims. (Cl. 340—172.5)

Figure 1:
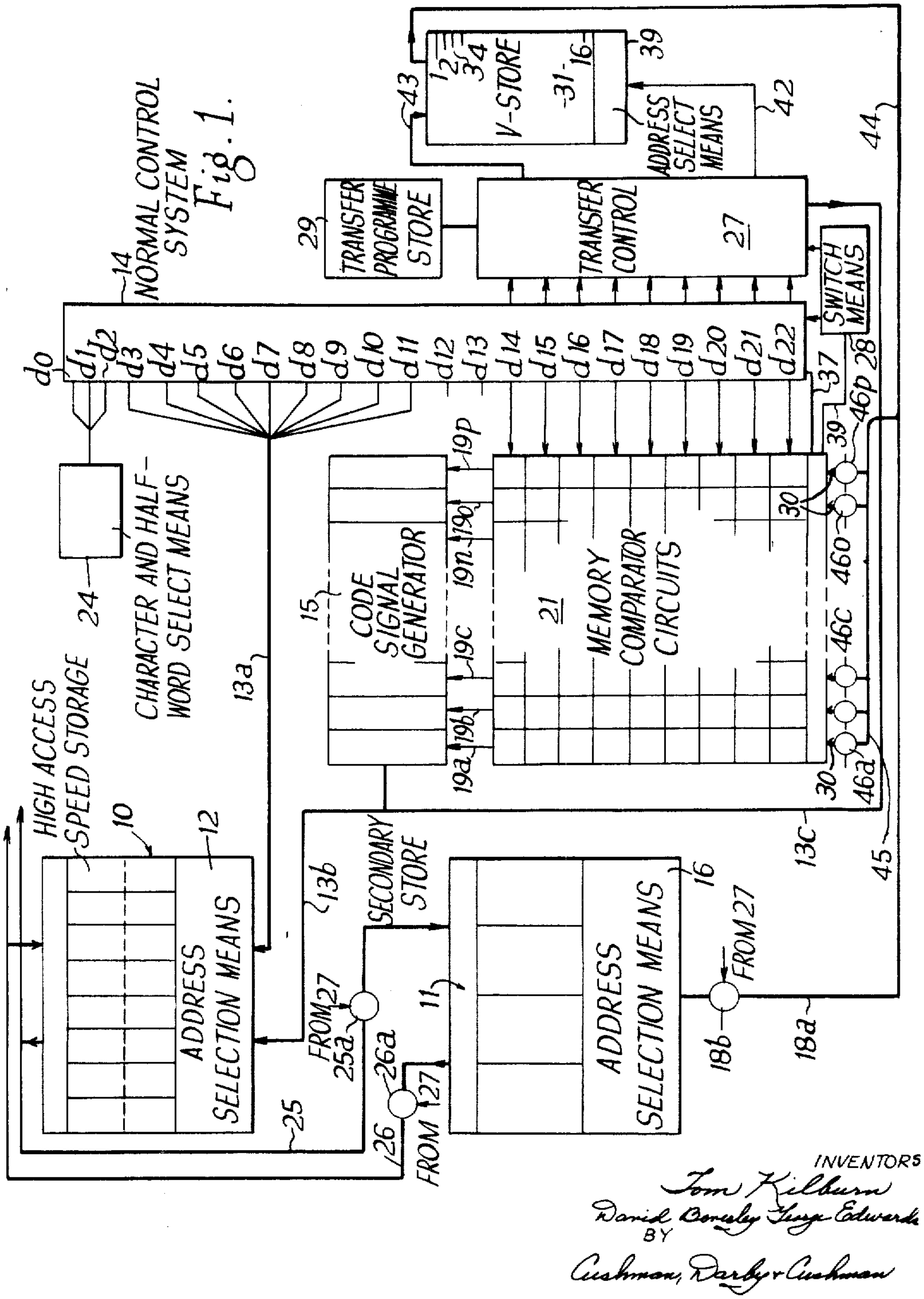

This invention relates to electronic digital computing machines and is more particularly concerned with improved data word storage arrangements in such machines.

It is accepted that the utility of an electronic digital computing machine, particularly one of so-called universal type adapted to deal with a wide range of computing problems as compared with a specialist type of machine designed for one specific form of task only, is determined to a large extent by the data word storage capacity thereof. The provision of a very large capacity data word storage in which each word storage location or address is capable of either immediate or high speed access is both expensive and conducive to large physical machine size and as an alternative it is already accepted practice to employ only a limited amount of immediate or high speed access storage and to provide a secondary or backing store of much lower access speed and then to arrange for the transference, usually in blocks of predetermined number, of data words to and fro between the two stores under the control of special transfer orders inserted at appropriate positions in the order programme.

Such a system of high speed and secondary storage, while useful in reducing cost and apparatus bulk, is far from convenient in use, especially by operators of limited experience, in view of the essential need to organize the required data word transfers at the appropriate times and to retain precise identification of the various data words during their change of storage addresses.

One object of the present invention is the provision of an improved data word storage system which reduces or even eliminates the above disadvantages and inconveniences while still employing only a limited amount of high access speed storage in conjunction with an appropriate amount of secondary or backing storage.

This object is achieved, in accordance with one basic aspect of the invention, by assigning a unique address identification definable in any instruction or order to every word storage location which is available in both the high access speed storage and at least a part of the secondary or backing storage, by arranging the address selection means of at least a part of the high access speed storage so that the address signal to which it is responsive can be altered, from time to time, in accordance with the particular address identification of any word storage location or group of storage locations whose signal content may be temporarily present therein and then providing means for effecting automatically a transfer from the secondary or backing storage to the high access speed storage of the signal content of a word storage location which is defined by the address identification signal of a currently operative order or instruction whenever such address identification signal fails to elicit response in the address selection means of the high speed storage and simultaneously modifying the said part of the high speed storage address selection means in accordance with the different address identification of the transferred signal. Preferably, any such automatic transfer operation is arranged to deal with a block of storage locations of predetermined number and is arranged also to be preceded by an automatic transfer to the secondary storage of the contents of the particular high speed storage address location or locations into which the newly required data is to be placed.

Figure 2:
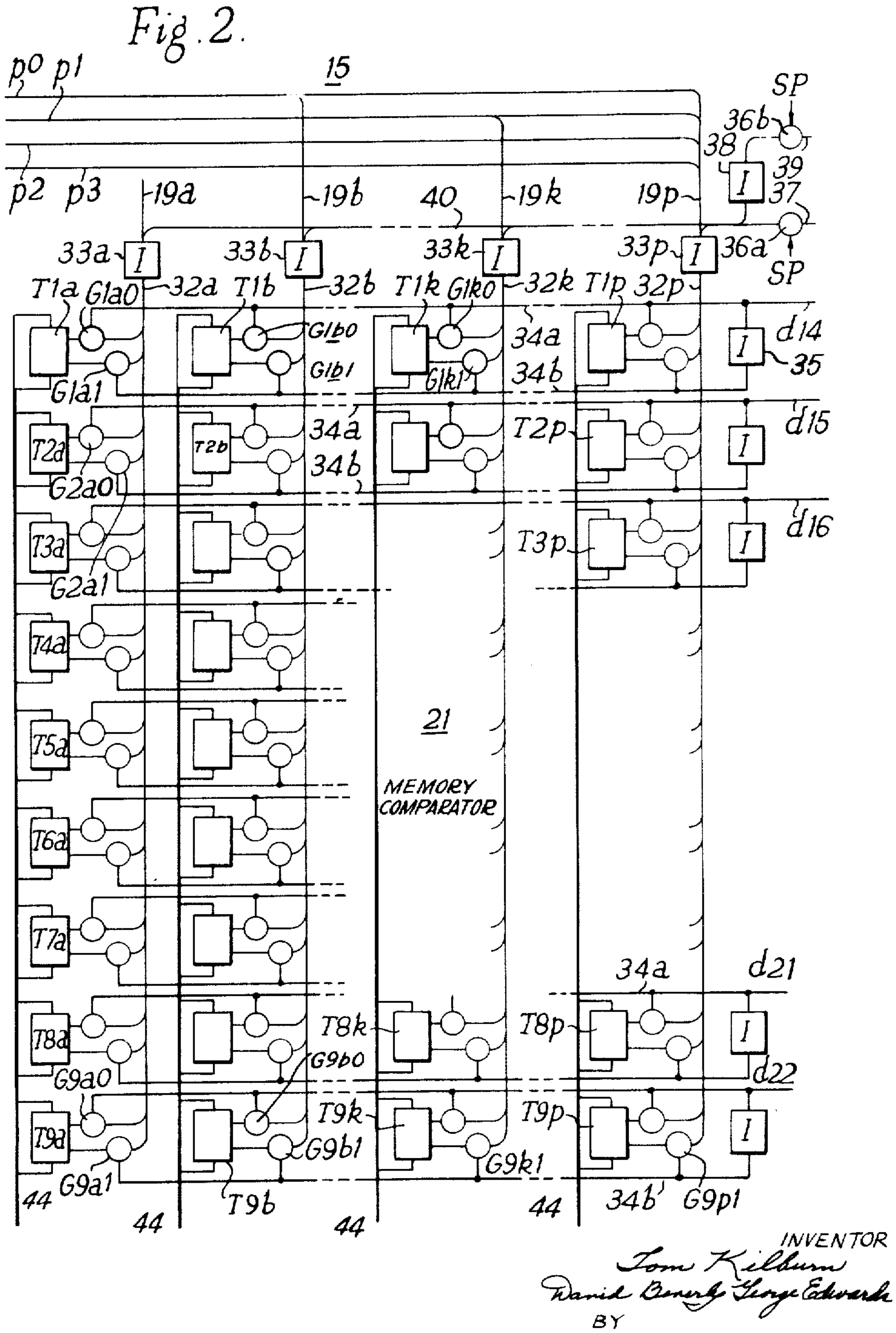

In order that the above and other features of the invention may be more readily understood, one embodiment thereof will now be described by way of illustrative example only and with reference to the accompanying drawings, in which:

FIGURE 1 is a block schematic diagram illustrating the principal components of a data word storage arrangement for an electronic digital computing machine; while FIGURE 2 is a more detailed but nevertheless schematic diagram of a memory-comparator device and a code signal generator device each forming part of the arrangement shown in FIGURE 1. Before proceeding to a detailed description of a preferred embodiment, it is believed that a succinct resume of the inventive combination will clarify the following detailed description. Briefly, the present invention renders it possible for different address signal combinations to select a single chosen storage address in an address storage means. In the prior art, a certain signal or group of signals (represented by digits in the address part of an instruction) produced a pattern associated with one certain address in the storage means. This group of signals was the only group which could provide access to the desired storage address. In this invention, each desired storage address is selected by a fixed associated pattern of address selection signals; however, these address selection signals bear no fixed relation to any instruction signals which might have been received. Presettable storage elements are provided and preset to produce a certain pattern of outputs. The patterns are compared with the instruction signal and if a coincidence is established, the desired storage address signal is generated. Thus, a different address digit or combinations of different address digits can be employed to select one and the same address location in storage through no change in the storage accessing mechanism.

Reference is first made to FIG. 1. In this embodiment, the immediate access or high speed data word storage 10 includes eight magnetic core store matrices, each capable of registering 1024 data words and jointly providing accommodation for a total of sixteen blocks each of 512 words. The secondary data word storage 11 comprises a plurality, e.g. four, magnetic drum stores although, as with the high speed storage, the actual form and number of storage locations of the storage devices used is of no concern to the present invention. Each drum store is assumed to have 128 separate block storage locations each capable of registering a single block of 512 data words.

Selection of any word storage location in any of the sixteen 512-word blocks in the high speed store 10 and selection of the required one of such sixteen 512-word blocks is effected by address selection means 12 which may comprise diode tree circuits of known form. Word location selection within any one 512-word block is effected by address digit signals applied by way of a multiple bus 13$a$ and derived from the nine address digits $d3$, $d4$–$d11$ of an instruction or control word while block selection is effected by four further address digit signals, hereinafter called the $p0$, $p1$, $p2$ and $p3$ signals, applied by way of multiple bus 13$b$. The word location signals for selecting a word location within any 512-word block are supplied directly from the instruction or normal control word sensing means in the control system, shown schematically by the block symbol 14, but the p0-p3 signals set forth above for effecting block selection are supplied from a four-channel multiple code signal generator device 15 under the control of nine further address digits d14, d15–d22 (see block 14) of the instruction or control word in a manner which will be described later. (The address digits d12 and d13 are not shown connected to block 21 in FIG. 1 but obviously can be.)

Selection of the required one of the 512 different 512-word block storage locations in the magnetic drum store 11 is effected by the associated address selection means 16 which may also comprise tree circuits. The signals controlling such selection are applied by way of multiple bus 18a and control gate means 18b and are also derived, although indirectly, from the above mentioned nine further address digits d14–d22 of the instruction or control word.

The CODE SIGNAL GENERATOR device 15 is adapted to provide, in response to a signal on any one of its input leads 19a, 19b–19p, a four-digit binary output consisting of the aforesaid p0, p1, p2 and p3 signals on the multiple bus 13b, the combinations respectively of such output signals being related to the particular input lead by which the input signal is supplied. Thus, if the signal is on the first input lead 19a, the emitted output signal is indicative of binary digits 0000 to select the first block 0 of the store 10 whereas energization of input lead 19p causes emission of binary digit signal 1111 to select the sixteenth block of the store 10 (all as described below). The device 15 may conveniently comprise sixteen separate trigger circuits with appropriate connections to the bus leads from their opposite polarity output terminals through suitable isolating buffer diodes or the like but a simplified and preferable form will be described later with reference to FIG. 2.

The signals on the above mentioned input leads 19a–19p are provided by composite MEMORY-COMPARATOR circuit arrangement 21 which is adapted to receive the nine separate address digit signals d14, d15–d22 provided by the normal control system 14 and to internally compare such address digit signals with the existing stored signal states of separate memory devices in each of the sixteen separate vertical banks of nine such memory devices. MEMORY-COMPARATOR 21 provides an output signal on that one of the leads 19a, 19b–19p, associated with the respective vertical banks, if, but only if, all of the existing stored signal states of the memory devices on that bank coincide precisely with the corresponding digit signals from the control system 14.

MEMORY-COMPARATOR circuit arrangement 21 may comprise sixteen separate banks of nine combined trigger and associated equivalence detecting circuits, one input to each equivalence detecting circuit being derived from the associated trigger circuit and the other input being derived from the related address digit signal supplied from the control system 14. The outputs from the nine equivalence detecting circuits of each group are then applied to a nine-input coincidence gate whose output provides the signal on the associated lead 19a–19p to the device 15. An alternative simplified and preferred form of the arrangement 21 is, however, also shown in FIG. 2 and will now be described.

Referring now to FIG. 2, the memory comparator circuit arrangement 21 comprises sixteen separate banks of nine two-stable-state trigger circuits. Thus the first bank comprises the trigger circuits T1a, T2a, T3a–T9a, the second bank the trigger circuits T1b, T2b, T3b–T9b and so on. For simplicity of illustration only two of the remaining banks, those of the eleventh bank of trigger circuits T1k, T2k–T9k and the sixteenth bank of trigger circuits T1p, T2p–T9p are shown but the remainder are precisely similar.

The triggering and the resetting inputs of each trigger circuit T1a, T2a–T9a of the first bank are connected by way of individual leads of a multiple bus 44 to related digit storage elements of one address in a special and so-called V store 31 (FIG. 1) with suitable interposed gate means whereby, when desired, each of the trigger circuits of such first bank can be set to either a "0" or "1" state, as the case may be, in accordance with the digit address values stored in said V storage elements. The triggering and resetting inputs of each trigger circuit of each of the other banks are similarly connected over the multiple bus 44 to related digit storage elements of fifteen further addresses in the V store, there being one address in such V store exclusive to each bank of the circuit arrangement 21.

The respective "0" and "1" state outputs of each of the trigger circuits T1a, T2a–T9a are connected through individual gate circuits G1a0, G1a1, G2a0, G2a1,–G9a0, G9a1 (conditioned or not, respectively, by signals d14–d22 as set forth presently) to a common lead 32a which is connected to the input of an inverter 33a. The "0" and "1" state outputs of the second bank trigger circuits T1b–T9b are similarly connected through individual gate circuits G1b0–G9b1 to a common lead 32b leading to an inverter 33b. The similar "0" and "1" state outputs of the remaining banks of trigger circuits are similarly arranged, the common leads of the eleventh and sixteenth banks being shown at 32k and 32p respectively with their associated invertes 33k and 33p.

The controlling inputs of the "0" state output gates G1a0, G1b0–G1k0–G1p0 associated with the first trigger circuit of each bank are connected in parallel to lead 34a while the controlling inputs of the opposite "1" state output gates G1a1, G1b1–G1k1–G1p1 are similarly connected in parallel to lead 34b. Lead 34b is connected to the output of an inverter 35 whose input is connected to lead 34a which in turn is connected to the control system 14, which provides lead 34a with a signal representing the value of the address digit d14 of the instruction or control word operative in such control system. The remaining gates are similarly connected, those associated with the second trigger circuit in each bank being controlled by the signalled value of the address digit d15, and so on, with the gates associated with the ninth trigger circuit in each bank controlled by the signalled value of the address digit d22 of such instruction or control word.

The output from each of the inverters 33a, 33b–33k–33p is applied over an associated input lead 19a, 19b–19k–19p to the CODE SIGNAL GENERATOR 15, which in accordance with the one lead 19a–19p which is energized, provides different combinations of p0, p1, p2 and p3 signals on multiple bus 13b which combinations represent respectively the binary code signal appropriate to that block of the high speed storage 10 which is related to each particular bank of the arrangement. Thus, the lead 19a which is associated with the first bank of the arrangement 21 and is related to the first block 0 of the high speed storage 10, is not connected to any one of the leads providing the signals p0–p3 so as, effectively, to cause signalling of the binary value 0000. Lead 19b, which is associated with the second bank of the arrangement 21 and the second high speed storage block, is connected only to the lead carrying the signal p0 so as to provide the binary signal 0001 whenever lead 19b is energized. The remaining leads 19c–19p are similarly arranged, lead 19k being, as shown, connected through isolating diodes or the like to the leads carrying the signals p1 and p3 to provide the binary signal 1010 and the lead 19p to all four leads carrying the signals p0, p1, p2 and p3 so as to provide the binary signal 1111 when the lead is energized.

Additionally, the output of each of the inverters 33a, 33b–33p is connected through an isolating buffer or diode to a common lead 40 which is connected through a gate 36a to an equivalence output lead 37, and also by way of an inverter 38 and a further gate 36b to a non-equivalence output lead 39.

The manner of operation of this MEMORY-COMPARATOR circuit arrangement 21 is as follows. As will be described later, each of the trigger circuits T1*a*, T2*a*–T9*a* of the first bank of trigger circuits of the arrangement 21 is set to its "0" or "1" state in accordance with the particular 9-digit block number which identifies, in an instruction word, the particular block of 512 words which is, at the moment, registered in the first block 0 of the high speed storage 10. The second and remaining banks of trigger circuits are or may be likewise set in accordance with the 9-digit block numbers of the fifteen further blocks of 512 words which are respectively registered in the remaining blocks of the high speed storage 10.

Upon the application of an instruction to the control system 14 in the normal way during operation of the machine, the address digits *d*14–*d*22 of that word signal the 9-digit block number of the required data word and cause corresponding energisation of one or other of the gate control lead pairs 34*a*, 34*b*. It will be noted that a value "1" input for any address digit from the control system 14 will condition the "0" value output gates of the associated trigger circuits to open whereas a "0" value input will condition the "1" value output gates of such trigger circuits to open. Accordingly, only when each of the trigger circuits of a bank is set to a state corresponding to the "0" or "1" value of the related address digit input from the control system 14 will the transmission of at least one active trigger circuit output to the related common lead, such as 32*a*, be inhibited. Whenever the setting of one or more of the trigger circuits of a bank does not coincide with the pattern of digit signals *d*14–*d*22 supplied from the control system, the associated common leads 32*a*–32*p* will become energized. As a result, the related inverters 33*a*, 33*b*–33*p* will then cease to provide an output and the related lead 19*a*–19*p* will not be energized. If, however, the trigger circuits of one bank are set precisely in accordance with the signalled values of the digits *d*14–*d*22, the common lead of that bank will fail to become energized because the trigger circuit output gate which is in the active one of the trigger circuit output leads will, in each case, be the gate which is not conditioned to open by the related address digit signal. In this case, the absence of an input signal to the related inverter of the group 33*a*–33*p* will cause the emission of an output signal by that inverter and the consequential energisation of the code signal output leads to form the *p*0, *p*1, *p*2 and *p*3 signals which identify the block in the high speed storage where the block of words having the signalled block address is at the moment located.

For example, supposing the eleventh block of the high speed storage contains a particular word block whose first and last address digits are "0" and "1" respectively. The trigger circuit T1*k* will be in the "0" state and the trigger circuit T9*k* will be in the "1" state. With this set of conditions, the *d*14 signal (first address digit) will be "0" and the *d*22 signal (last address digit) will be "1." Lead 34*a* controlling conditioning of the output gate G1*k*0 of the trigger circuit—T1*k* will not be energized but, owing to the inverter 35, the lead 34*b* will be energized. This will condition gate G1*k*1 to open. However, trigger T1*k* is in the zero condition so that common lead 32*k* is not energized. Lead 34*a* controlling conditioning of the output gate G9*k*0 to T9*k* is high, but since T9*k* is ON, its one output is high but its gate G9*k*1 is closed. The latter is, however, the one in the active output of the trigger circuit and accordingly the possible energization of common lead 32*k* therethrough is blocked. Similarly with each of the other trigger circuits of the bank. The resultant output from inverter 33*k* energizes code signal generator lead *p*1 and *p*3 (as set forth above) giving the code signal output 1010 which will select the eleventh block in the high speed storage 10.

Whenever one of the inverters 33*a*–33*p* provides an output in such manner, lead 40 is also energized so that, at a time instant determined by the application of a strobing pulse SP to gates 36*a*, 36*b*, an output signal indicating that coincidence has been established and that the required word block is in the high speed storage 10 is transmitted to the control system over lead 37. Conversely, if none of the trigger circuit banks has a setting state pattern corresponding to the block address digit configuration, then every common lead 32*a*–32*p* will be energized and no inverter 33*a*–33*p* will provide an output. In this case, the inverter 38 will supply an output to gate 36*b* and when this is opened by the aforesaid strobing pulse SP a signal indicating non-equivalence and indicative that the required word block is not in the high speed storage 10 will be transmitted to the control system over lead 39.

Returning now to FIG. 1, the read outputs and write inputs of the high speed storage 10 are connected by the usual multiple busbars of a parallel mode machine to the various other machine elements which, in the interest of clarity, are not shown since they form no part of the invention. In addition, however, the read outputs of the high speed storage 10 are connected by way of a multiple transfer bus 25, which includes outward transfer gate means 25*a*, to the write inputs of the secondary storage 11 while, in like manner, the read outputs of such secondary storage 11 are connected by way of a further multiple transfer bus 26, which includes inward transfer gate means 26*a*, to the write input of the high speed storage 10.

In addition to the normal machine control system 14, which is of the usual and well known form including an order or instruction register for retaining each sequentially presented order or instruction signal and therefrom providing the necessary series of gate control and other signals, the arrangements of the present invention include a second or transfer control system 27 which is interconnected with the machine elements and with the main control system 14 through switch circuit means illustrated schematically at 28 and which, when actuated, serve to transfer control of the machine from the normal control system 14 to the transfer control system 27. At the instant when changeover from normal control to transfer control takes place, the only-partially completed operation of the machine to deal with the normal instruction in the control system 14 becomes suspended with the said instruction still retained in the control register of the control system 14.

The transfer control system 27 includes an order register and this is supplied, in a manner analogous to the normal control arrangements of computing machines with a series of special transfer orders forming a transfer subroutine which is permanently registered in an associated transfer programme store 29 which may be of any convenient type such as a magnetic core store matrix or an endless magnetic tape loop. As already stated, the V-store 31 has sixteen separate storage locations, one for each block of the high speed storage 10, and is provided with address selection means 39 for selecting any one of the sixteen locations in the V-store 31 under the control of an address signal supplied over multiple bus 42 from the transfer control 27 (as hereinafter described). The transfer control 27 is also supplied with a series of signals representing the block address digits of the (now suspended) normal instruction registered in the normal control system 14. Signals are supplied from the transfer control system 27 to the write input of the V-store 31, by way of bus 43, while read out signals from such V-store 31 are supplied by way of bus 44, bus 18*a* and gate means 18*b* to the address selection means 16 of the secondary storage 11, and also by way of multiple bus 45 and gate circuit means 46*a*, 46*b*–46*p* and via leads 30 to each of the trigger circuit banks of the MEMORY COMPARATOR circuit 21. The transfer control system 27 is also connected to the address selection means 12 of the high speed storage 10 by way of bus 13*c*. It will be understood that, in the interests of simplicity and ease of understanding, many circuit details and connections have been omitted; the precise form of these is of no particular interest since many possible arrangements are already well known and established in the art.

Other details of the arrangement not so far dealt with will become apparent from the following description of the manner of operation. A normal instruction or order word, forming part of a computing order programme, is applied in the usual way to the control system 14 and this results in the provision of a group of address digit signals *d*0, *d*1–*d*22 defining a particular required data word. The digit signals *d*0 and *d*1 are used to define one of four separate character-signal groups in any half-word part of a word storage location while the digit *d*2 is used to define which of the two half-word parts may be required. These three digit signals are accordingly applied to means 24 for effecting the desired half-word and character selection within any selected address location. Such means 24 may conveniently comprise gate circuits in each of the individal read-out and write-in leads of the output and input bus lines of the high speed storage 10.

The address digit signals *d*3–*d*22 provide a unique identification for each word storage location whether it be in the high speed store 10 or the secondary store 11. The nine digit signals *d*3–*d*11, by direct application over bus 13*a* to the address selection means 12, serve to select a particular one of the 512 locations in a storage block if, but only if, it is in the high speed store 10. The remaining address digit signals *d*12–*d*22 (*d*12 and *d*13 are not shown connected in FIG. 1) define the particular block out of a maximum of 512 blocks and these signals are initially applied to MEMORY-COMPARATOR 21.

In a manner as explained later, the nine trigger circuits, e.g. the trigger circuits T1*a*–T9*a*, of each of the sixteen banks of such trigger circuits in the circuit arrangement 21 have been pre-set (under control of an address stored in the V-store as described presently) to register the respective block identification of the sixteen 512-word signal blocks already held in the high speed storage 10. If the applied address digit signals *d*12–*d*22 due to the operative instruction or control word in the control system 14 define one of the sixteen different block members already set up in the arrangement 21, coincidence will be registered, as already explained, in one only of the sixteen banks and that bank will provide an output signal to the related input lead 19*a*–19*p* and as a result the appropriate binary signal will be emitted by the code signal generator 15 to set the address selection means 12 in the manner requisite to select the desired word block. The simultaneously developed equivalence signal on lead 37 is fed to the normal control system 14 where it initiates the appropriate reading or writing or other form of machine operation which thereafter proceeds in the wholly normal manner.

In the contra case, where the address digit signals *d*12–*d*22 supplied by the control system 14 in response to the currently operative instruction or control word define a block number which is different from any of the sixteen already set up in the circuit arrangement 21 and which is therefore not registered in the high speed storage 10, no coincidence will be registered in any of the sixteen banks and no output signal will be present on any of the leads 19*a*–19*p*. At the same time, a non-equivalence signal will be provided on lead 39 and this is applied to the switch means 28 which immediately operates to transfer machine control from the normal control system 14 to the transfer control system 27, at the same time retaining the current and only partially-completed normal instruction in the system 14.

The transfer control system 27 now commences to work through its predetermined sub-routine to transfer instructions drawn one by one from the transfer programme store 29. The first transfer operation is one of clearing one of the 512-word blocks of the high speed storage 10 and transferring the block content to that one of the block locations in the secondary store 11 which is identified by the number at present set up on that bank of trigger circuits of MEMORY-COMPARATOR 21, which is related to the high speed storage block thus chosen for clearance. In the machine being described, each of the sixteen 512-word blocks of the high speed storage is cleared sequentially in regular order and for this purpose the transfer control system 27 includes the usual and well known means for altering the value of a number defining an address by adding or subtracting 1 at each operation with the transfer sub-routine. Thus, if the last previous transfer operation cleared and refilled block N of the high speed storage 10, the block next to be cleared and refilled in the operation being described will be block N+1 (or N−1).

As will become more apparent later, the particular nine-digit number set up on any bank of trigger circuits of MEMORY-COMPARATOR 21 is also registered in the related (N+1) storage address of the V-store 31. The first order of the transfer sub-routine from the transfer control store 29 is accordingly one defining the four digits signalling the 512-word block (N+1) in the high speed storage which is next in order to be cleared and a function control signal to read that address (N+1) of the V-store 31 and apply it to the address selection means 16 of the secondary store 11. The next transfer sub-routine order is to transfer the contents of the defined high speed storage block (N+1) to the defined secondary storage block by way of the outward transfer bus 25 and its gate means 25*a*, the latter being supplied with the requisite gate opening signals from the transfer control system 27.

When such transfer operation to clear a block of the high speed storage has been completed, the next transfer sub-routine order specifies the clearance of the same address (N+1) in the V-store 31 (i.e. that related to the now-cleared high speed storage block) and the writing therein, over bus 43, of the nine digit signals *d*14–*d*22 of the suspended normal order of the control system 14. The next transfer sub-routine order specifies the reading of the same address (N+1) in the V-store, i.e. read out the nine-digit number of the required block, via transfer bus 44, bus 18*a* and gate means 18*b* to set the address selection means 16 of the secondary storage 11. At the same time, the read out nine digit number is transferred over bus 44 and bus 45 to the related bank (N+1) of the trigger circuits of the comparator circuit 21, the appropriate gate means 46*a*–46*p* being opened at the same time by the address signal (N+1) used for controlling the V-store address selection means 39, and, via output lines 30 setting the trigger circuits whereby the related bank of trigger circuits of the comparator circuit 21 becomes set up with the identification number of the new block. The next transfer sub-routine operation is to use the same (N+1) high speed block address signal for application over bus 13*c* to the address selection means 12 of the high speed storage to hold ready the cleared block in the latter and thereafter to transfer to the block thus held ready the defined block in the secondary storage 11, by way of inward transfer gate 26*a* (opened by signal from transfer control 27) and bus 26.

The completion of this last word transfer operation marks the end of the transfer sub-routine in the transfer control 27 which thereupon causes release of the switch means 28 to revert machine control back to the normal control system 14. When this occurs, the re-presented digit signals *d*14–*d*22 immediately find coincidence with the setting of the (N+1) bank of trigger circuits in MEMORY-COMPARATOR 21 to allow machine operation to proceed to complete the suspended instruction held in the control system 14.

We claim:

1. A data word storage arrangement for an electronic digital computing machine comprising a data word store having a plurality *n* of separate uniquely identifiable storage locations for storing data word signals, signal control address selection means having a selection signal input for rendering any one of said $n$ storage locations accessible in response to the supply to said selection signal input of an address selection signal uniquely identifying the required storage location in said store, an address selection signal generator having a selection signal output connected to said input of said address selection means and $n$ control inputs for providing an address selection signal at said signal output appropriate to operate said address selection means to render a particular one of said $n$ storage locations accessible in accordance with the particular one of said $n$ control inputs which is energised, a memory comparator having $n$ separate outputs connected respectively to said $n$ control inputs of said address selection signal generator and a plurality of separate address digit signal inputs connected to said memory comparator, said memory comparator comprising $n$ groups of digit memory elements presettable to different states and coincidence testing circuits associated with said $n$ groups and providing an output signal when the pattern of signals applied to said plurality of separate address digit signal inputs coincides with the pattern of setting of the different presettable digit memory elements of said group and means for controlling the presettable states of each of said digit memory elements of said comparator in each of said groups.

2. A data word storage arrangement for an electronic digital computing machine comprising a data word store having a plurality $n$ of separate uniquely identifiable storage locations each having a plurality of separate data word storage locations for storing data word signals, signal controlled address selection means having a selection signal input for rendering any one of said $n$ storage locations accessible in response to the supply to said selection signal input of an address selection signal uniquely identifying the required one of said storage locations, an address selection signal generator having a selection signal output connected to said input of said selection means and $n$ control inputs for providing an address selection signal at said signal output appropriate to operate said address selection means to render any particular one of said $n$ storage locations accessible in accordance with the particular one of said $n$ control inputs which is energised, a memory comparator having $n$ separate outputs connected respectively to said $n$ control inputs of said address selection signal generator and a plurality of separate address digit signal inputs, said memory comparator comprising $n$ separate groups of presettable digit memory elements, each of said groups including a presettable digit memory element for each of said address digit signal inputs, coincidence testing circuits, said presettable elements and said plurality of separate address digit signal inputs being each connected to said coincidence testing circuit to provide, on the associated one of said $n$ outputs of said memory comparator, an output signal for energising the interconnected input of said selection signal generator only when the pattern of signals applied to said plurality of separate address digit signal inputs coincides with the pattern of setting of the different presettable digit memory elements of said group and means for individually controlling the presettable states of each of said digit memory elements of said comparator in each of said groups.

3. A data word storage arrangement for an electronic data handling machine comprising data word storage means having a plurality $n$ of separate uniquely identifiable storage locations for storing data signals, signal controlled address selection means having a selection signal input for rendering any one of said $n$ storage locations accessible in response to the supply to said selection signal input of an address selection signal uniquely identifying the required storage location, an address selection signal generator having a selection signal output connected to said selection signal input of said selection means and $n$ control signal inputs for providing an address selection signal at said signal output appropriate to operate said address selection means to render any particular one of said $n$ storage locations accessible in accordance with the particular one of said $n$ control signal inputs which is energised, a memory comparator having $n$ separate signal outputs connected respectively to said $n$ control signal inputs of said address selection signal generator and a plurality of separate address digit signal inputs, said memory comparator comprising $n$ groups of presettable digit memory elements, each of said groups including a number of two-stable-state memory devices, coincident testing means said respective memory devices and separate address digit signal inputs being each connected to said coincidence testing means to provide on the associated one of said $n$ outputs an output signal for energising the interconnected input of said selection signal generator only when the pattern of address digit signals applied to said separate address digit signal inputs coincides with the pattern of setting of the different digit memory elements of said group and individual setting circuits connected to each of said two state memory devices for controlling the setting states of each of said memory devices in each of said groups thereby to permit alteration of the particular address digit signal which will be effective to provide access to each of said $n$ storage locations in said data word storage means.

4. An information word storage arrangement for an electronic information handling machine comprising storage means having a plurality $n$ of separate uniquely identifiable storage locations for storing information signals, signal controlled address selection means for rendering any one of said $n$ storage locations accessible in response to the supply to said selection signal input of an address selection signal uniquely identifying a required storage location, a source of address signals capable of defining uniquely a number of storage locations, and presettable signal conversion means having a signal input connected for energisation by said address signals and a signal output connected to said address selection means for rendering effective a different address signal to cause selection of a certain one of said $n$ storage locations in said storage means.

5. A storage arrangement for an electronic information handling machine comprising a first storage means having a plurality $n$ of separate uniquely identifiable and rapidly accessible storage locations for storing information signals, a second storage means having a plurality $y$ of separate uniquely identifiable storage locations for storing information signals, signal controlled address selection means having a selection signal input and interconnected with said first storage means for rendering any one of said $n$ storage locations accessible in response to the supply to said selection signal input of an address selection signal uniquely identifying a required storage location, an address selection signal generator having a signal output connected to said input of said selection means and a plurality of control signal inputs for providing any one of $n$ different address selection signals identifying respectively the different storage locations of said first storage means in response to selective energisation of said control inputs, said address selection signal generator means including a number of said control inputs sufficient uniquely to define every one of the $n+y$ locations in both of said storage means, and including presettable conversion means for altering from time to time the pattern of selective energisation of said control inputs which will be effective to operate said address selection means to obtain access to any particular one of said $n$ storage locations.

6. A storage arrangement for an electronic information handling machine comprising a first storage means having a plurality $n$ of separate uniquely identifiable and rapidly accessible storage locations for storing information signals, a second storage means having a plurality $y$ of separate uniquely identifiable storage locations for storage information signals, signal controlled address selection means having a selection signal input and interconnected with said first storage means for rendering any one of said $n$ storage locations accessible in response to the supply to said selection signal input of an address selection signal uniquely identifying a required storage location, an address signal generator having a signal output connected to said input of said selection means for providing any one of $n$ different address selection signals identifying respectively the different storage locations of said storage means, said address signal generator having a plurality of separate address digit signal inputs sufficient in number to allow unique identification by the differing pattern thereof for each of said $n+y$ storage locations in both of said storage means and including $n$ presettable address signal registers and coincidence testing means, each of said coincidence testing means being also connected to said address digit signal inputs to provide an output to cause operation of said address signal generator to provide an address selection output signal, only when the pattern of an address digit signal applied to said address digit signal inputs coincides with the setting pattern of one of said signal registers.

7. For a storage system in an electronic information handling machine, a memory comparator comprising at least one bank of a plurality of memory elements each registering the value of a different address digit of a word address signal, address digit input means for receiving a group of input address digit signals equal in number to the number of separate memory elements in said bank, comparison circuit means connected to said memory elements of said bank and to said address digit signal inputs, to provide an output signal only when the pattern of address digit signals applied to said address digit signal inputs coincides with the setting pattern of the memory elements in said bank and a signal generator connected to the output from said coincidence circuit means to provide an address selection control signal uniquely identifying said bank when coincidence is established between the applied group of address digit signals and the previously existing setting state of said memory elements.

8. For a storage system in an electronic information handling machine, a memory comparator comprising a plurality of separate banks each including a plurality of presettable digit memory elements, one each for registering the value of a different address digit of a word address signal, address digit input circuit means for receiving a group of input address digit signals equal in number to the number of settable digit memory elements in said bank, and comparison means connected to said settable digit memory elements and to said address digit signal inputs to provide an output signal only when the pattern of address digit signals applied to said address digit signal inputs has a certain comparison status compared with the setting pattern of the memory elements in said bank, and a signal generator, having a plurality of control inputs connected respectively to the outputs from said comparison means of said different banks to provide an address selection control signal uniquely identifying the particular bank, when said certain comparison status is established between the applied group of address signals and the previously existing setting pattern of the memory elements of such bank.

9. An electronic information handling machine which includes a first store having a plurality $n$ of separate uniquely identifiable storage locations for storing information signals, a second store having a plurality $y$ of separate uniquely identifiable storage locations for storing information signals, signal transfer circuits between said first and second stores, transfer control apparatus for governing transfer of information signals between said first and second stores under the control of applied transfer control signals, signal-controlled address selection means for rendering any one of said $n$ storage locations of said first store accessible in response to an address selection signal uniquely identifying the required storage location, an address signal generator having $n$ control inputs for providing an address selection signal appropriate to operate said address selection means to render any particular one of said $n$ storage locations accessible in accordance with the particular one of said $n$ control inputs which is energised, $n$ banks of memory comparator circuits each having an output connected to a related one of said $n$ control inputs of said signal generator and a plurality of separate address digit signal inputs at least equal in number to the number of address digit signals required to identify uniquely any one of the combined total of the $n$ storage locations of the first store and the $y$ storage locations of the second store, each of said memory comparator circuits comprising a presettable memory element for each of said address signal inputs and comparator means connected to each of said memory elements and each of said address signal inputs to provide an output only when the pattern of the address digit signals applied to said address digit signal inputs bears a certain relation to the previous setting pattern of the said memory elements, signal sensing means for providing a transfer-initiating signal when no one of said memory comparator circuits provides a control signal output to said address signal generator and circuit means for applying said transfer-initiating signal to said transfer control apparatus to initiate an automatic transfer operation between said first and second data stores.

10. A machine according to claim 9 in which said transfer control apparatus includes means for effecting automatically a transfer from said second store to said first store of the information signal content of the storage location which is defined by the address digit signals applied to said memory comparator circuit means and which includes means for simultaneously altering the setting states of the memory elements of the bank of said memory comparator circuit associated with the location in said first store to which the transfer is made.

11. A machine according to claim 10 in which said transfer control apparatus causes transfer of the signal content of a block of storage locations of predetermined number including the particular one defined by the address digit signals applied to the memory comparator circuits.

12. A machine according to claim 11 in which said transfer control apparatus operates to effect an initial automatic transfer to said second store of the information signal content of a chosen storage location of the first store before the transfer thereinto of the required new information.

13. A machine according to claim 12 in which said transfer control apparatus operates to transfer said first store information back to that location in the second store which is defined by the address digit signal set up on said memory comparator, thereby to maintain an uninterrupted record of its identity.

14. An information signal storage arrangement for an electronic information handling machine comprising addressable information signal storage means, and address selection means responsive to address selection control signals for selectively rendering available each addressable location of said signal storage means and including, a memory comparator circuit comprising at least one bank of separate memory elements, one each for registering the value of a different address digit of an address signal, circuit means for applying and comparing a group of such address digit signals, one with each of the values registered by said memory elements, and output signal providing means, for providing alternative output signals, indicating respectively equivalence or non-equivalence of said registered digit values with said applied digit signals and means controlled by said equivalence indicating signal for rendering said address selecting means operative.

15. An arrangement according to claim 14 in which said memory comparator circuit arrangement includes signal generator means for generating an address selection control signal for operating said address selection means upon the establishment of said equivalence indicating signal.

16. An arrangement according to claim 14 in which said bank of memory elements comprises a plurality of two-stable-state trigger circuit devices providing alternative "0" or "1" state outputs in accordance with the state into which they are set and in which each of said "0" and "1" state outputs of the trigger circuits of the bank is connected to a common lead through an equivalence gate circuit, the "0" state output gate of each trigger circuit being connected to a signal lead energised when the applied address digit signal is of value "1" and "1" state output gate of each trigger circuit being connected to a signal lead energised when the applied address digit signal is of value "0" whereby said common lead fails to become energized from any trigger circuit of said bank only when every trigger circuit is set to a "0" or "1" state corresponding to the "0" or "1" values of the respective address digit signals.

17. In combination, addressable storage means for storing information signals in each of a plurality of different addressable locations, address selecting means for selecting a chosen addressable location among said different addressable locations in conformance with a pattern of signals applied thereto, said pattern being identified by one certain address identifying signal, each pattern uniquely identifying a different addressable location, means for translating different address identifying signals into said pattern of signals and comparator means responsive to certain ones of address identifying signals for passing said signals to said translating means.

18. A device as in claim 17, said translating means comprising a plurality of presettable means, and means for altering the setting of the presettable means whereby the application of different address identifying signals to said translating means produces the same said pattern of signals.

19. A device as in claim 18, said comparator means including comparing means, said comparing means being controlled jointly by signals representative of the pattern of said plurality of settable means and said address identifying signals.

20. A device as in claim 19, said comparator producing said pattern of signals, when different settable patterns of said plurality of settable means bear a compatible relationship to different address identifying signals.

21. A device as in claim 20, including a second addressable storage means, means for transferring information signals from one to the other of said two storage means, and means rendering said transfer means effective upon the address identifying means failing to determine a compatible relationship to a certain settable pattern of said plurality of settable means.

References Cited by the Examiner

UNITED STATES PATENTS

| | | | |
|---|---|---|---|
| 2,900,132 | 8/1959 | Burns et al. | 340—172.5 |
| 3,015,441 | 1/1962 | Rent et al. | 340—172.5 |
| 3,018,472 | 1/1962 | Piloty | 340—172.5 |

FOREIGN PATENTS

| | | |
|---|---|---|
| 809,507 | 2/1959 | Great Britain. |

R. C. BAILEY, *Primary Examiner.*

IRVING L. SRAGOW, *Examiner.*

L. S. GRODBERG, P. J. HENON, *Assistant Examiners.*